United States Patent
Weinkauf et al.

(10) Patent No.: US 7,107,893 B2
(45) Date of Patent: Sep. 19, 2006

(54) PISTON-PIN BEARING FOR INTERNAL COMBUSTION ENGINES

(75) Inventors: Dieter Weinkauf, Stuttgart (DE); Günter Zugschwert, Tamm (DE)

(73) Assignee: Mahle GmbH, Stuttgart (DE)

( * ) Notice: Subject to any disclaimer, the term of this patent is extended or adjusted under 35 U.S.C. 154(b) by 18 days.

(21) Appl. No.: 10/515,098

(22) PCT Filed: May 20, 2003

(86) PCT No.: PCT/DE03/01616

§ 371 (c)(1),
(2), (4) Date: Nov. 19, 2004

(87) PCT Pub. No.: WO03/098078

PCT Pub. Date: Nov. 27, 2003

(65) Prior Publication Data

US 2005/0150374 A1    Jul. 14, 2005

(30) Foreign Application Priority Data

May 22, 2002 (DE) ................................ 102 22 463

(51) Int. Cl.
    *F16J 1/14*    (2006.01)
(52) U.S. Cl. ............................................ 92/187
(58) Field of Classification Search .................. 92/187
    See application file for complete search history.

(56) References Cited

U.S. PATENT DOCUMENTS 2,990,226 A * 6/1961 Fangman ...................... 92/187
3,006,698 A * 10/1961 Dilworth ..................... 384/430
3,745,889 A * 7/1973 Hill et al. .................... 92/187
5,072,654 A   12/1991 MacGregor
5,746,169 A * 5/1998 Issler et al. ................... 92/187
2005/0034598 A1* 2/2005 Ribeiro et al. ................ 92/186

FOREIGN PATENT DOCUMENTS

| DE | 16 50 206 A | 8/1970 |
|---|---|---|
| DE | 21 52 462 A | 4/1973 |
| DE | 30 36 062 A | 4/1982 |
| DE | 41 41 279 A | 6/1993 |
| GB | 851 322 A | 10/1960 |
| WO | WO2005078321 A1 * | 8/2005 |

* cited by examiner

Primary Examiner—Thomas E. Lazo
(74) Attorney, Agent, or Firm—Collard & Roe, P.C.

(57) ABSTRACT

A piston-pin bearing for an internal combustion engine wherein a cylindrical piston pin is mounted. The piston-pin bearing has a hub bore that significantly reduces mechanical stress in the piston, results in a longer service life for the piston, and avoids the formation of noise in the piston-pin bearing. Thus hub bore has a lateral surface with a highly oval shape along the axis of the hub in the equatorial-zenith-equatorial area, corresponding to the parameter representation of an oval that follows $x = b/2 \times \cos \alpha$; $y = a/2 \times \sin \alpha$ for $0° \leq \alpha \leq 180°$. The hub bore has a circular cylindrical shape in the equatorial-nadir-equatorial region of the hub, whereby a is a large oval diameter; b=D is a small oval diameter; D is a diameter of the cylindrical hub; and $\alpha$ is the angle forming any particular unlimited line counter to the z axis.

4 Claims, 4 Drawing Sheets

Figure 1:
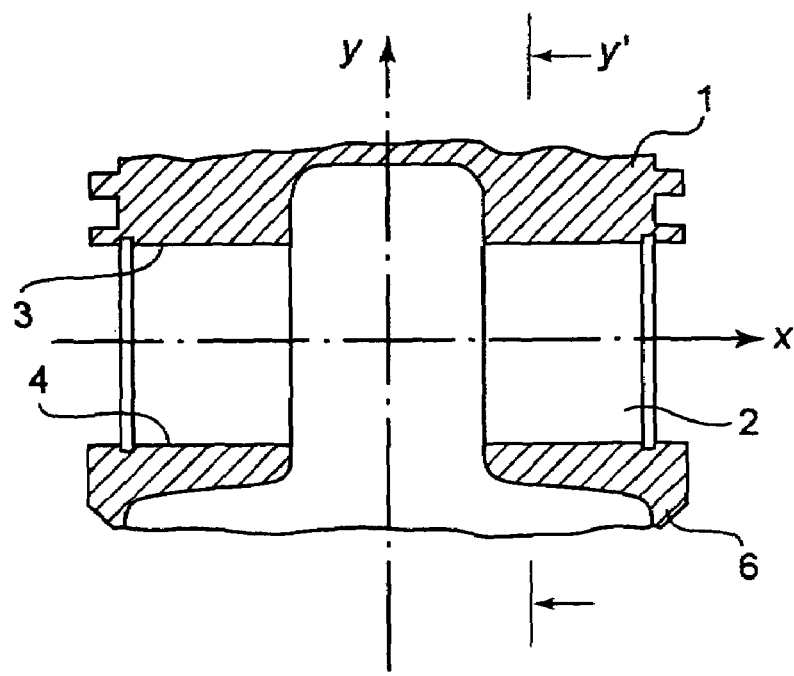

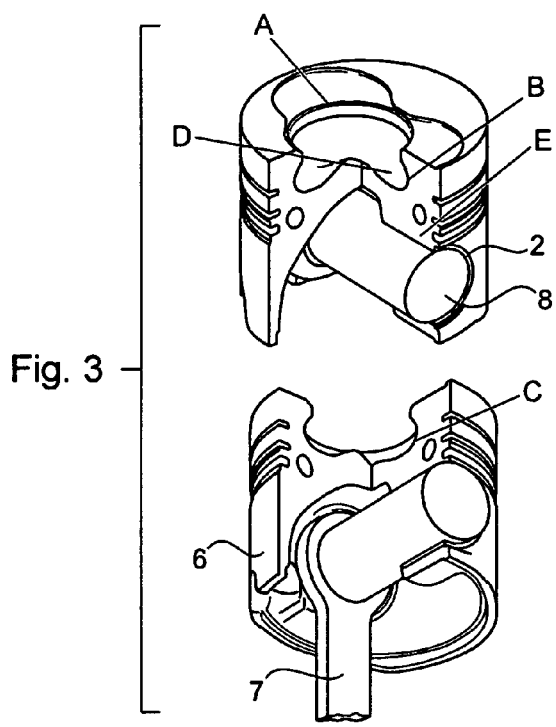
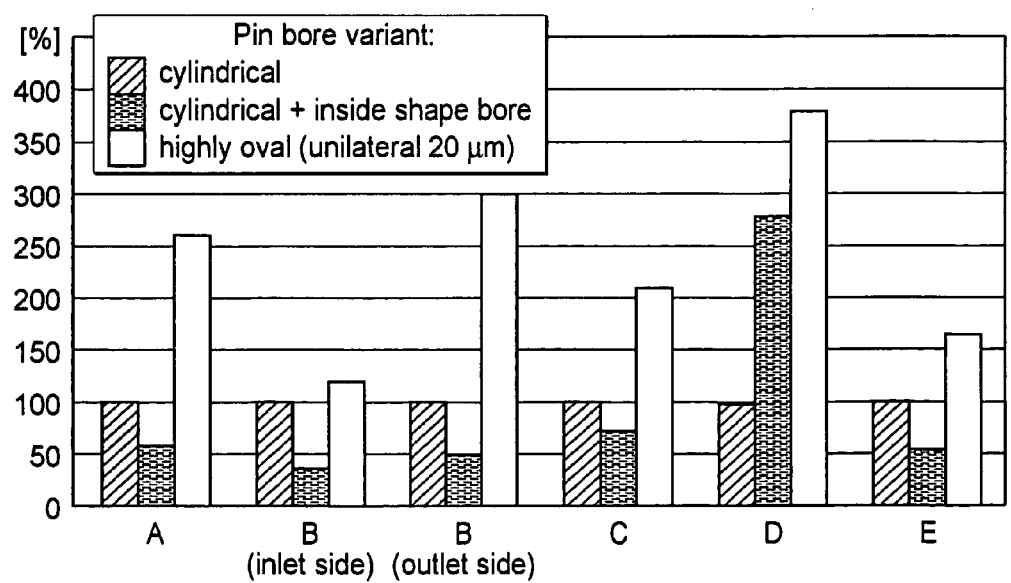
Fig. 3
Fig. 4

PISTON-PIN BEARING FOR INTERNAL COMBUSTION ENGINES

CROSS REFERENCE TO RELATED APPLICATIONS

Applicants claim priority under 35 U.S.C. §119 of Germany Application No. DE 102 22 463.3, filed May 22, 2002. Applicants also claim priority under 35 U.S.C. §365 of PCT/DE03/01616 filed May 20, 2003. The international application under PCT article 21(2) was not published in English.

The invention relates to a piston pin bearing for an internal combustion engine, having pin bores in which a piston pin is mounted.

It is known, for example, from DE 21 52 462 B2, DE 41 41 279 A1, and DE 30 36 062 C2 to configure pin bores of pistons for internal combustion engines so as to meet stress and deformation requirements. The shapes of the pin boss that are mentioned there result from the general recognition that the gas forces that act on the piston crown are transferred to the piston crown by way of the pin bosses, whereby the piston pin is periodically bent through as a result of its rotational movements in the connecting rod. According to the conventional assumption, the pin bores are thereby stressed both in the horizontal plane and the vertical plane, particularly, however; at the zenith and nadir of the pin bore, with regard to tension, pressure, and bending. In order to meet the requirements of this deformation, DE 21 52 462 B2 proposes a boss shape in which the mantle line of the pin bore is bent, the axis of the pin bore assumes a slightly curved progression towards the center of the piston, and the cross-section of the bore is shaped in oval shape, whereby the small semi-axis of the oval runs parallel to the longitudinal axis of the piston.

In DE 30 36 062 C2, it is proposed that the pin bores are configured to be oval in cross-section and that the great semi-axis of the oval runs parallel to the longitudinal axis of the piston. In addition, the side of the pin bores removed from the longitudinal axis of the piston has a greater ovality, and the side adjacent to the longitudinal axis of the piston has a smaller ovality, whereby in another embodiment, the mantle line is configured in an incline at the apex of the bore.

All of the aforementioned shapes, however, do not prevent cracks from occurring in the skirt and in the region of the bowl edge, as well as the bowl base, in practice, with an increasing stress on the piston due to increasing ignition pressures, after a few hundred hours of operation, the cause of which can lie in overly great play between the piston pin and the pin bore in the zenith and the nadir of the bore. In order to achieve as little play as possible, an oval pin bore is proposed in DE 16 50 206 A1, in which the large axis of the oval comes to lie crosswise to the longitudinal axis of the piston. With this, the reliability against seizing and a low level of noise between the piston pin and the pin bore are supposed to be achieved, at the same time.

It is the task of the invention to indicate an improved pin bore shape for a piston pin bearing, as compared with the state of the art, which allows a clear reduction in mechanical stresses in the piston and therefore also an extension of the useful life of the piston. In addition, noise formation in the piston pin bearing is supposed to be avoided by the shape.

According to the invention, the task is accomplished by means of the characteristics of claim 1.

By means of the unilateral high ovality, which is implemented only in the equator-zenith-equator pin boss region, the result is advantageously achieved, on the one hand, that in the case of the implementation of the highly oval bore, according to the invention, the regions that lie farther outside in the pin bore, in other words the lateral regions of the pin bore, are subjected to greater stress. This results in a greater moment, because of the enlarged lever arm with reference to the pin axis, thereby reducing the bending of the piston about the pin axis. This results in lower tangential stresses at the bowl edge and the bowl base of the combustion bowl, as compared with the state of the art.

On the other hand, because of the circular cylindrical shape that is implemented on one side, only in the equator-nadir-equator pin boss region, in which the mantle line of the cylinder that lies in the nadir of the pin bore runs parallel to the pin bore axis, the result is advantageously achieved that the play between the piston pin and the pin boss is minimized in the case of a contact change of the piston pin from the top to the bottom of the pin boss.

In total, a clear increase in the useful lifetime of the piston is achieved by means of the shaping of the pin bore according to the invention, as compared with the known state of the art.

Advantageous further developments are the object of the dependent claims.

Figure 2:
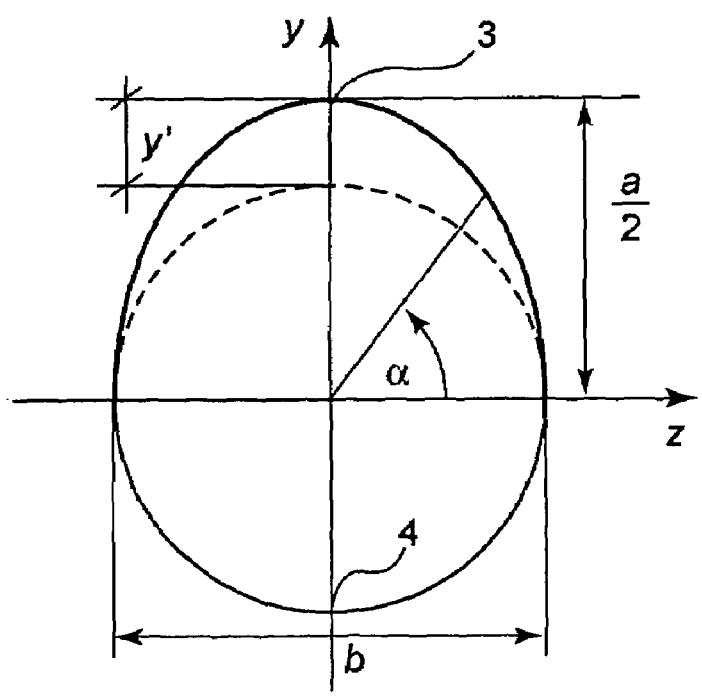
Figure 5:
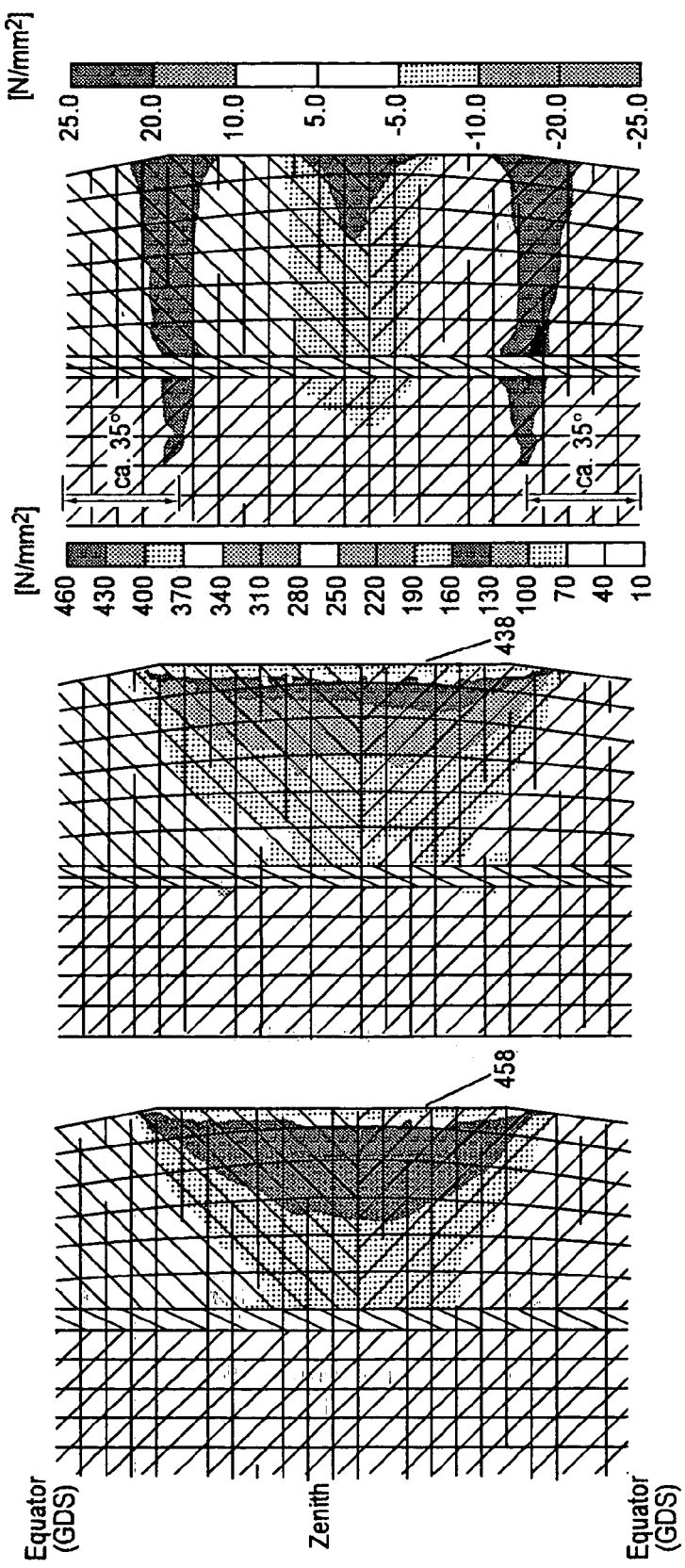
Figure 6:
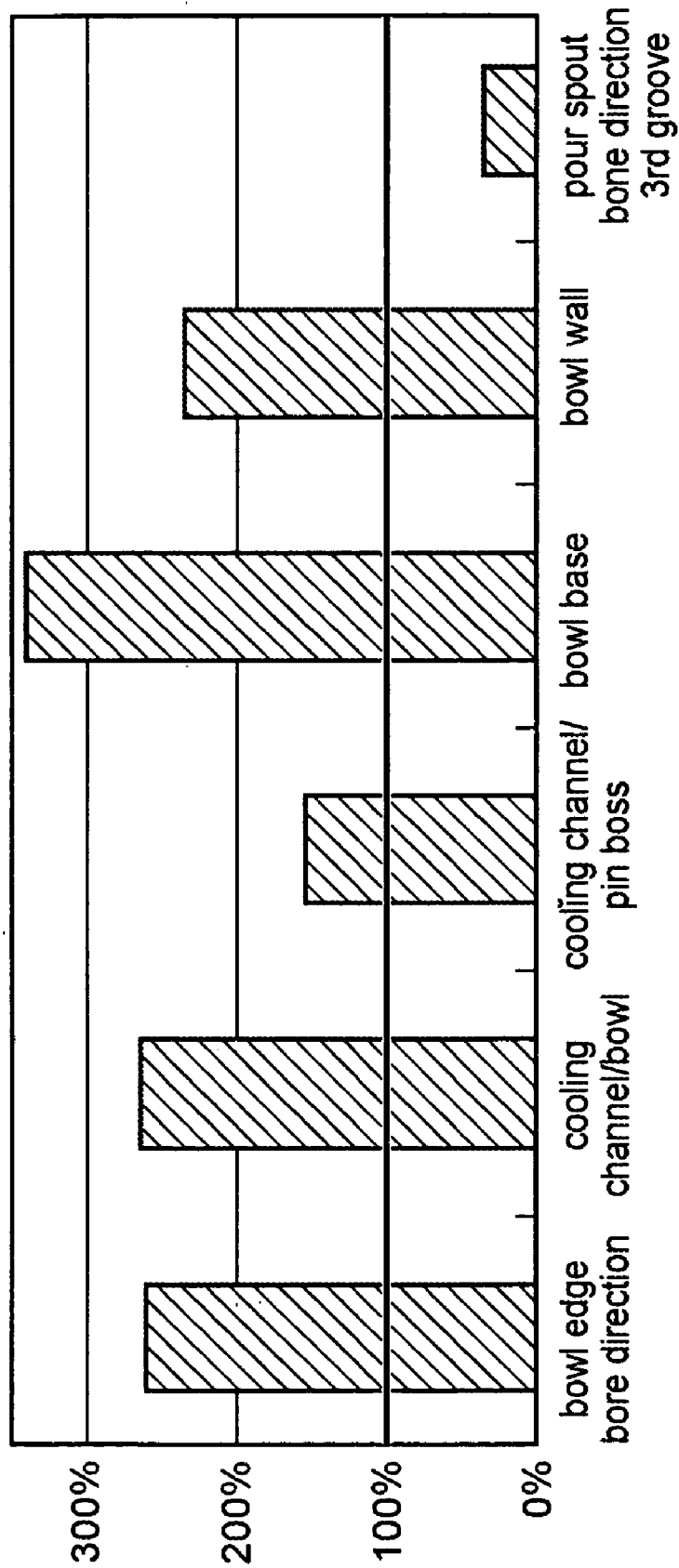

The invention will be explained in greater detail below, using an exemplary embodiment. The drawing shows:

FIG. 1 a partial longitudinal cross-section through a piston;

FIG. 2 a cross-section through the pin bore, cut along the line yy;

FIG. 3 a piston in a perspective view, with a representation of various highly stressed points A–E;

FIG. 4 a graphic representation of the influence of various pin bore versions on the useful lifetime, according to the positions shown in FIG. 3;

FIG. 5.1 a representation of the radial stresses in the pin bore as the development of a cylindrical pin boss shape, between the equator-zenith-equator, with a circular cylindrical pin boss shape between the equator-nadir-equator;

FIG. 5.2 a representation of the radial stresses in the pin bore as the development of a highly oval pin boss shape, between the equator-zenith-equator, with a circular cylindrical pin boss shape between the equator-nadir-equator;

FIG. 5.3 a representation of the differences in the stresses with a highly oval and a cylindrical pin bore;

FIG. 6 a representation of the change in useful lifetime.

As is evident from FIG. 1, a piston 1 for an internal combustion engine has a pin bore 2 having an upper pin boss region 2.1 and a lower pin boss region 2.2, in which a circular cylindrical piston pin (not shown) is mounted. According to FIGS. 1 and 2, the upper pin boss region is disposed on the gas force side, on which the mantle surface, designated as 5, of the pin bore 2 is shaped in highly oval shape on the circumference, along the entire longitudinal pin boss axis X, in the region of the pin boss equator-pin boss zenith-pin boss equator, and the parameter representation of the oval follows $$x = b/2 \times \cos \alpha \}$$

$$y = a/2 \times \sin \alpha \} \text{ for } 0° \leq \alpha \leq 180°$$

In the lower region 2.2 of the pin bore 2, the mantle surface 5 is configured in circular cylindrical shape along the entire longitudinal pin boss axis X, between the pin boss equator-pin boss nadir-pin boss equator, whereby the following applies for both pin boss regions:

a: great oval diameter;

b=D: small oval diameter;

D: diameter of the cylindrical pin boss part;

α: angle that any desired ray forms relative to the Z axis.

For the entire pin bore, it holds true that the mantle lines 3 and 3, which lie in the zenith and the nadir, run parallel to the longitudinal pin boss axis, which stands perpendicular to the longitudinal piston axis. It is practical if the ovality amounts to 0.05 to 0.2% of the pin bore diameter D.

As is evident from FIGS. 3 and 4, a dramatic increase in useful lifetime can be achieved by means of the pin boss design according to the invention; this results from a 1000 hour piston stress test for a light-metal diesel piston at 190 bar ignition pressure. In FIG. 3, the piston is shown in an exploded view, with the skirt 6, connecting rod 7, and piston pin 8, as well as the measurement points A–E.

FIGS. 5.1 and 5.2 show developments of the upper pin boss region 2.1, showing the surface pressure distributions in the cylindrical and highly oval version, as well as the difference in the pressure distributions from FIG. 5.1 and 5.2, according to FIG. 5.3, when using a light metal diesel piston, at an ignition pressure of 175 bar. As is evident, the radial stresses are higher in the outer regions of the pin bore, so that because of the enlarged lever arm with reference to the pin axis, a greater moment results, which reduces the bending of the piston about the pin axis. This results in reduced tangential stresses at the bowl edge, for example, but also other regions in the combustion bowl are placed under less stress.

FIG. 6 indicates the change in useful lifetime, proceeding from a cylindrical pin bore that corresponds to the value of 100%. With this, the aforementioned reductions in stress, particularly at the bowl base, the bowl edge in the pin direction (MuRaBoRi) and the cooling channel/bowl (KüKa) result in a strong increase in the useful lifetime of the pistons.

REFERENCE SYMBOLS 1 piston
2 pin bore
2.1 upper pin boss region (highly oval)
2.2 lower pin boss region (circular cylindrical)
3 zenith, mantle line in the zenith
4 nadir, mantle line in the nadir
5 mantle surface of the entire pin bore
6 piston skirt
7 connecting rod
8 piston pin
X longitudinal pin boss axis, equator
Y longitudinal piston axis
Z crosswise pin boss axis
Y' difference between the great semi-axis of the oval and the circular diameter of the lower-pin boss-region
GDS counter-pressure side of the piston
DS pressure side of the piston

The invention claimed is:

1. Piston pin bearing for an internal combustion engine, having pin bores in which a piston pin is mounted, wherein the mantle surface (5) of the pin bore (2) is shaped in highly oval shape along the entire supporting pin length, in the region of the pin boss equator-pin boss zenith-pin boss equator, and the parameter representation of the oval follows, where x is a longitudinal Pin boss axis, y is a longitudinal piston axis and the z is a crosswise pin boss axis:

$x = b/2 \times \cos \alpha \}$ $y = a/2 \times \sin \alpha \}$ for $0° \leq \alpha \leq 180°$ and is configured in circular cylindrical shape in the region of the pin boss equator-pin boss nadir-pin boss equator, where:

a: great oval diameter;
b=D: small oval diameter;
D: diameter of the cylindrical pin boss part;
α: angle that any desired ray forms relative to the z axis.

2. Piston (1) for an internal combustion engine, as recited in claim 1, wherein the mantle lines of the pin bore (2) that lie in the zenith (3) and the nadir (4) run parallel to the pin bore axis.

3. Piston (1) for an internal combustion engine, as recited in claim 1, wherein the piston pin (8) is shaped cylindrically.

4. Piston (1) for an internal combustion engine as recited in claim 3, wherein the piston pin (8) has mold undercuts.

* * * * *